United States Patent

Miyashita et al.

[11] Patent Number: 5,966,470
[45] Date of Patent: Oct. 12, 1999

[54] CODING APPARATUS FOR IMAGE COMPRESSION

[75] Inventors: Mitsuhiro Miyashita, Nishinomiya; Tatsushi Bannai, Sakai, both of Japan

[73] Assignee: Matsushita Electric Industrial Co., Ltd., Osaka, Japan

[21] Appl. No.: 08/968,094

[22] Filed: Nov. 12, 1997

Related U.S. Application Data

[63] Continuation of application No. 08/257,706, Jun. 10, 1994, abandoned.

[30] Foreign Application Priority Data

Jun. 10, 1993 [JP] Japan ................................. 5-138197

[51] Int. Cl.⁶ .............................. G06K 9/36; G06K 9/46
[52] U.S. Cl. ........................................ 382/248; 358/432
[58] Field of Search ................................. 382/248, 250, 382/251, 232, 233, 239; 341/55, 95, 65, 67; 348/403, 405, 420, 390, 395, 400, 432; 358/427, 432, 426, 268.3, 430, 433

[56] References Cited

U.S. PATENT DOCUMENTS

| | | | |
|---|---|---|---|
| 4,509,038 | 4/1985 | Hirano | 340/347 |
| 5,073,821 | 12/1991 | Juri . | |
| 5,109,451 | 4/1992 | Aono et al. | 382/248 |
| 5,272,528 | 12/1993 | Juri et al. | 382/250 |
| 5,289,548 | 2/1994 | Wilson et al. | 382/250 |
| 5,295,203 | 3/1994 | Krause et al. | 382/56 |
| 5,313,203 | 5/1994 | Suu et al. | 341/50 |
| 5,404,139 | 4/1995 | Bhandari et al. | 341/81 |
| 5,424,733 | 6/1995 | Fimoff et al. | 341/67 |
| 5,432,512 | 7/1995 | Park | 341/67 |

FOREIGN PATENT DOCUMENTS

| | | |
|---|---|---|
| 426429 | 5/1991 | European Pat. Off. . |
| 4-086183 | 3/1992 | Japan . |
| 4-087469 | 3/1992 | Japan . |
| 2260428 | 4/1993 | United Kingdom . |

OTHER PUBLICATIONS

W.B. Pennebaker, T.L. Mitchel, YPEG Still Image Date Compression Standard, Van Nostrand Reinhold, N.–Y., 1993, pp. 441–446.

*Primary Examiner*—Phuoc Tran
*Attorney, Agent, or Firm*—Wenderoth, Lind & Ponack, L.L.P.

[57] ABSTRACT

A coding apparatus for image compression which includes a transformer that transforms image data into a plurality of transform coefficients arranged in a matrix; a quantizer that quantizes each of the transform coefficients into a coefficient data of a predetermined number of bits; a data divider that divides the coefficient data into a fixed-length data part and a variable-length data part and a variable-length encoder that encodes the variable-length data part into a variable-length code.

10 Claims, 10 Drawing Sheets

| | | | | | | |
|---|---|---|---|---|---|---|
| 1 | 2 | 6 | 7 | 15 | 16 | 28 | 29 |
| 3 | 5 | 8 | 14 | 17 | 27 | 30 | 43 |
| 4 | 9 | 13 | 18 | 26 | 31 | 42 | 44 |
| 10 | 12 | 19 | 25 | 32 | 41 | 45 | 54 |
| 11 | 20 | 24 | 33 | 40 | 46 | 53 | 55 |
| 21 | 23 | 34 | 39 | 47 | 52 | 56 | 61 |
| 22 | 35 | 38 | 48 | 51 | 57 | 60 | 62 |
| 36 | 37 | 49 | 50 | 58 | 59 | 63 | 64 |

Fig.6

| | | | | | | |
|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

| DC | −14 | 0 | 5 | 0 | 0 | 0 | 0 |
|---|---|---|---|---|---|---|---|
| −9 | −8 | −6 | 0 | 0 | 0 | 0 | 0 |
| 8 | 0 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

CODING APPARATUS FOR IMAGE COMPRESSION

This application is a continuation of now abandoned application, Ser. No. 08/257,706, filed Jun. 10, 1994.

BACKGROUND OF THE INVENTION

1. Field of the Invention

The present invention relates to a coding apparatus for image compression that compresses the data of a digital image signal.

2. Description of the Related Art

As a highly efficient compression technique for encoding natural images, there has been proposed a method of performing a 2-dimensional discrete cosine transform (called a DCT hereafter) and quantizing the transform coefficients to encode them into variable-length codes. This method is adopted by the JPEG (Joint Photographic Experts Group) of CCITT/ISO.

The variable-length coding part of this method uses a single table of codes to perform variable-length coding. However, if statistical properties of input symbols and characteristics of the variable-length coding are in disagreement, the efficiency of the coding declines. Therefore, a method of preparing several tables of variable-length codes and selecting one of them for encoding was proposed (For example, see Japanese Laid-open Patent Publication Hei. 4-87469).

In this method, the variance of the DCT coefficients after quantizing in each block is obtained, and one of the several tables of variable-length codes is selected based on the variance to perform the variable-length coding.

However, the statistical properties of occurring symbols vary not only from block to block but also vary greatly depending on the order of the transformed domain in each block. Therefore, by the above method, a table of variable-length codes can not be selected depending on the order of the transformed domain. Further, the method requires much more overhead information for indicating a selected table of variable-length codes.

SUMMARY OF THE INVENTION

The object of the present invention is therefore to solve the above problems and to provide a coding apparatus for image compression that improves the efficiency of variable-length coding.

In order to achieve the aforementioned objective, the coding apparatus for image compression of the present invention comprises a blocking and DCT circuit for transforming image data into a plurality of transform coefficients arranged in a matrix; a quantization circuit for quantizing each of said transform coefficients into coefficient data of a predetermined number of bits; a data division circuit for dividing said coefficient data into a fixed-length data part and a variable-length data part, and a variable-length coding circuit for encoding said variable-length data part into a variable-length code.

By this composition, statistical properties of occurring symbols representing run length and gray level can be made similar in all of the transformed blocks, so that the efficiency of the variable-length coding is improved.

BRIEF DESCRIPTION OF THE DRAWINGS

These and other objects and features of the present invention will become clear from the following description taken in conjunction with the preferred embodiments thereof with reference to the accompanying drawings throughout in which like parts are designated by like reference numerals, and in which.

DETAILED DESCRIPTION OF THE PREFERRED EMBODIMENTS

The preferred embodiments according to the present invention will be described below with reference to the accompanying drawings.

Figure 1:
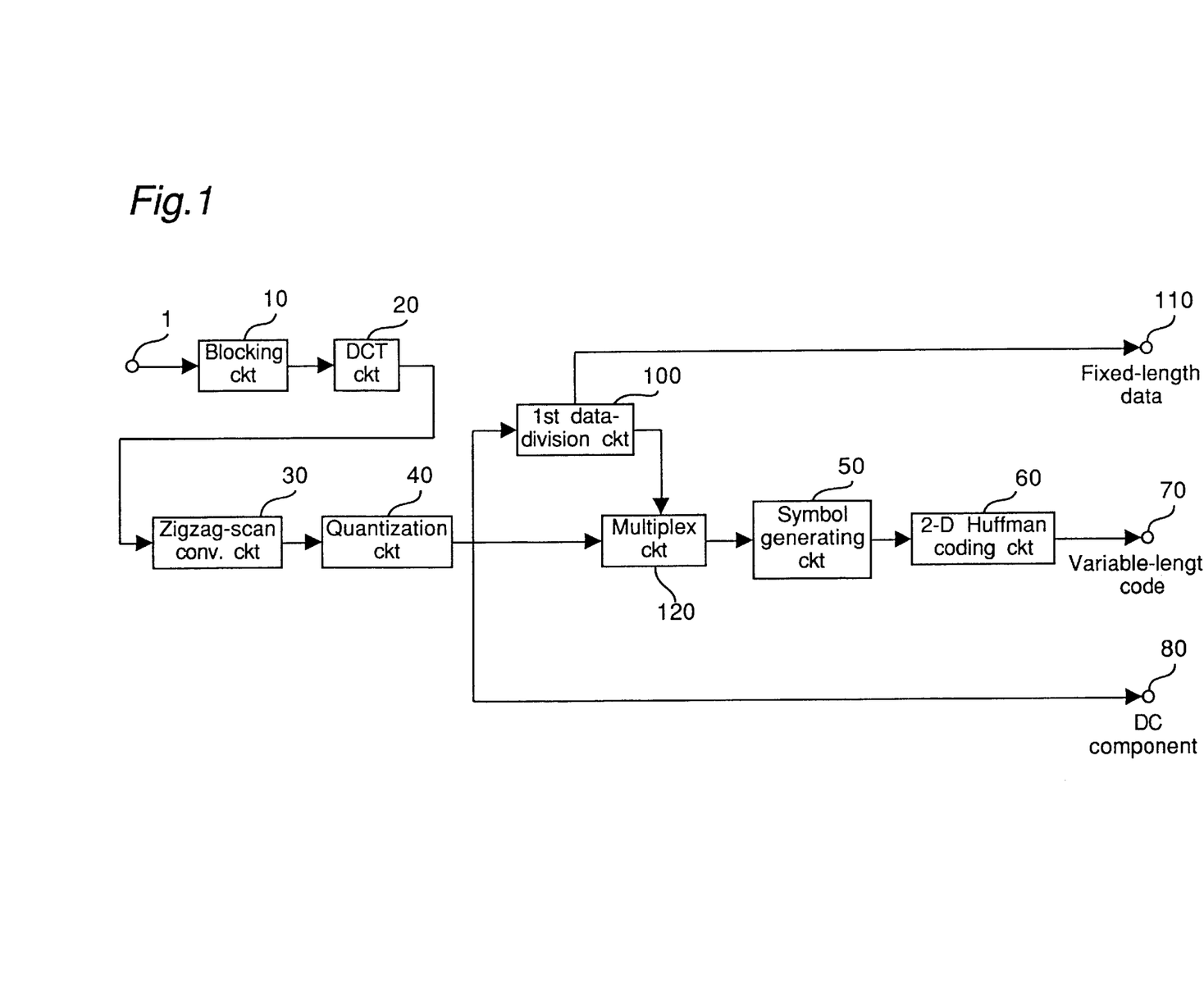
FIG. 1 is a block diagram of a coding apparatus for image compression of a first embodiment in accordance with the present invention.

FIG. 1 is a block diagram of a coding apparatus for image compression of a first embodiment in accordance with the present invention. In FIG. 1, element 1 denotes a terminal for inputting image data, 10 denotes a blocking circuit that segments the image data into 8×8 blocks or matrixes; element 20 is a DCT circuit that performs a DCT of each 8×8 block, or matrix 30 denotes a zigzag-scanning conversion circuit; element 40 is a quantization circuit that quantizes DCT coefficients into coefficient data words; element 50 is a symbol generating circuit that counts the length of consecutive zero coefficient data (zero-run) and obtains the group number of the succeeding non-zero coefficient data (run-level) to output a combination of the zero-run and run-level and overhead bits; element 60 is a 2-D Huffman coding circuit that deems the run-level as a symbol and generates a variable-length code corresponding to the symbol by looking up a table of 2-dimensional Huffman codes and multiplexes the code with the overhead bits; and element 70 is a terminal for outputting the result. Element 80 is a terminal for outputting the DC component of the DCT coefficients, and element 100 is a first data-division circuit that divides each coefficient data word corresponding to a low-frequency domain into a fixed-length data part and a variable-length data part element 110 is an output terminal for outputting the fixed-length data parts; and element 120 is a multiplexer that multiplexes the variable-length part output from the first data-division circuit 100 and high-frequency components of coefficient data.

Figure 5:
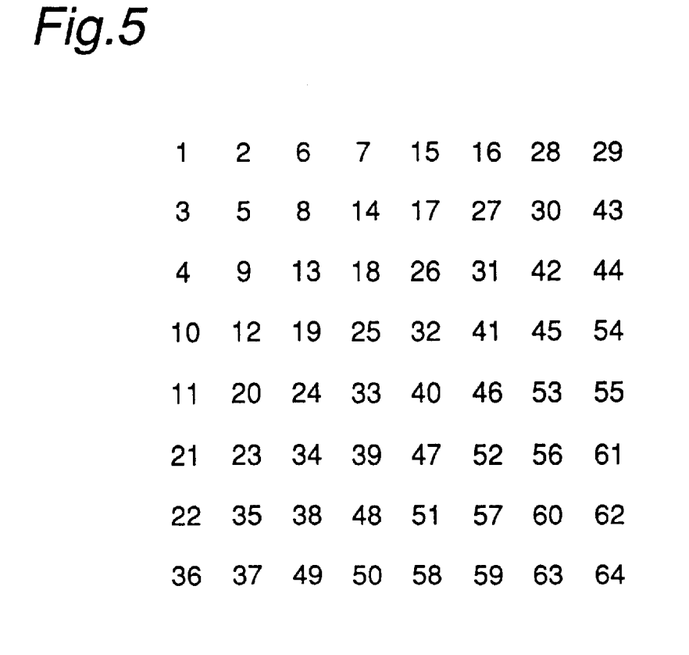
FIG. 5 is a conceptual schema for describing zigzag scanning of a DCT.
Figure 6:
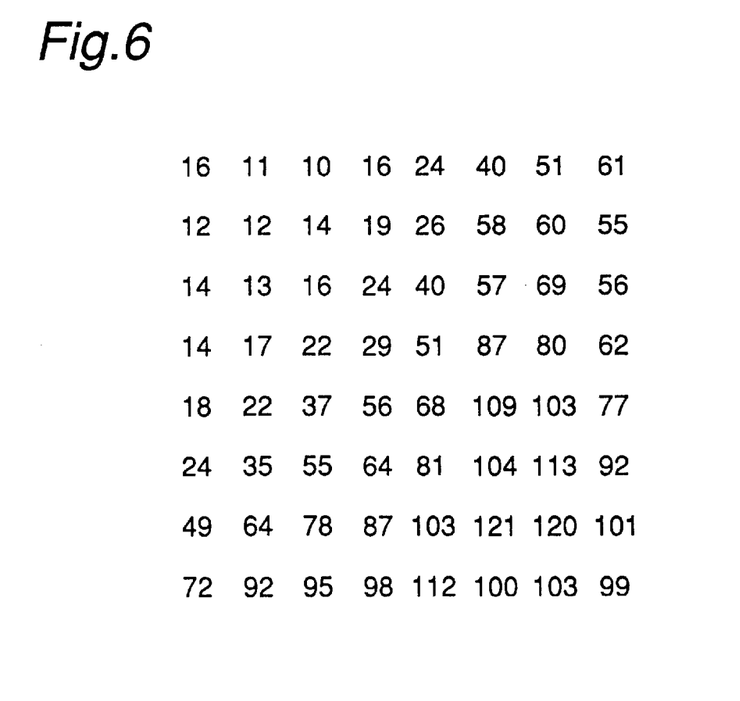
FIG. 6 shows a quantization table in the quantization step for DCT coefficients.

The operation of the coding apparatus for image compression composed as above is described in the following with reference to FIG. 1. First, image data input through input terminal 1 is segmented into 8×8 blocks or matrics by the blocking circuit 10 and is transformed into 8×8 (=64) DCT coefficients by the DCT circuit 20. The DCT coefficients are reordered by the zigzag-scanning conversion circuit 30 and are output in the zigzag-scanning order as shown in FIG. 5, and are quantized by the quantization circuit 40 with quantizing values as shown in FIG. 6. After the quantization, the DC component of the quantized DCT coefficients is encoded into a fixed-length code and output to output terminal 80. Of the AC components of the quantized DCT coefficients, the first 4 coefficient data in the zigzag-scanning order, which correspond to a low-frequency domain, are output to the first data-division circuit 100, and the remaining coefficient data of the AC components are output to the multiplexer 120.

Figure 7:
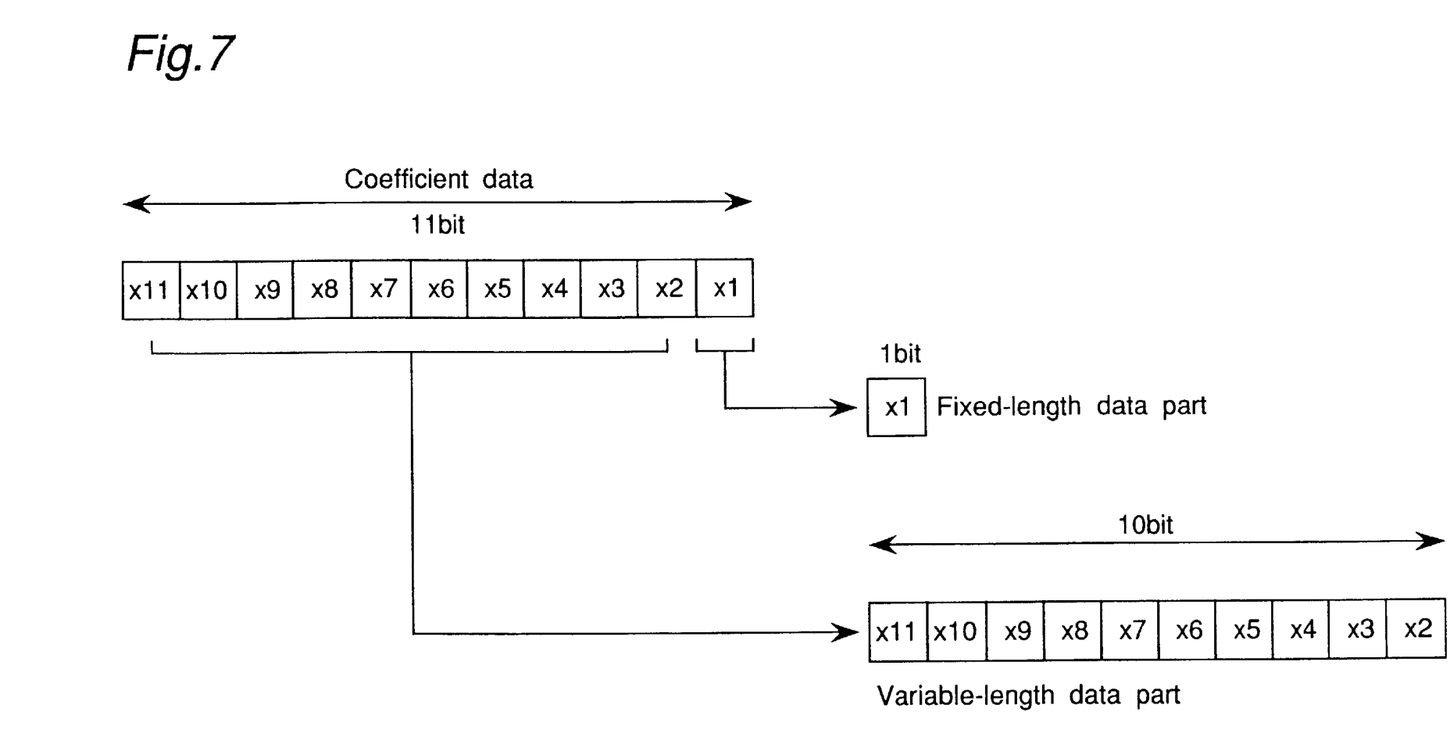
FIG. 7 is a conceptual schema for describing the operation of a first data-division circuit in the present embodiments.

The first data-division circuit 100 divides an input coefficient data word (consisting of 11 bits including a sign bit in the present embodiment) into a fixed-length data part consisting of the lowest one bit and a variable-length data part consisting of the remaining upper 10 bits, as shown in FIG. 7. The variable-length data part is output to the multiplexer 120, and the fixed-length data part is output to the output terminal 110.

The multiplexer 120 multiplexes four coefficients of a low-frequency domain in the variable-length data part output from first data-division circuit 100 and coefficient data of the remaining AC components output from quantization circuit 40 to output the result to the symbol generating circuit 50.

The symbol generating circuit 50 outputs overhead bits and a run-level symbol obtained by combining a zero-run and the group number of the succeeding non-zero coefficient data to the 2-D Huffman coding circuit 60. The 2-D Huffman coding circuit 60 generates a variable-length code corresponding to the input run-level symbol and overhead bits to output the code to output terminal 70.

Figure 8:
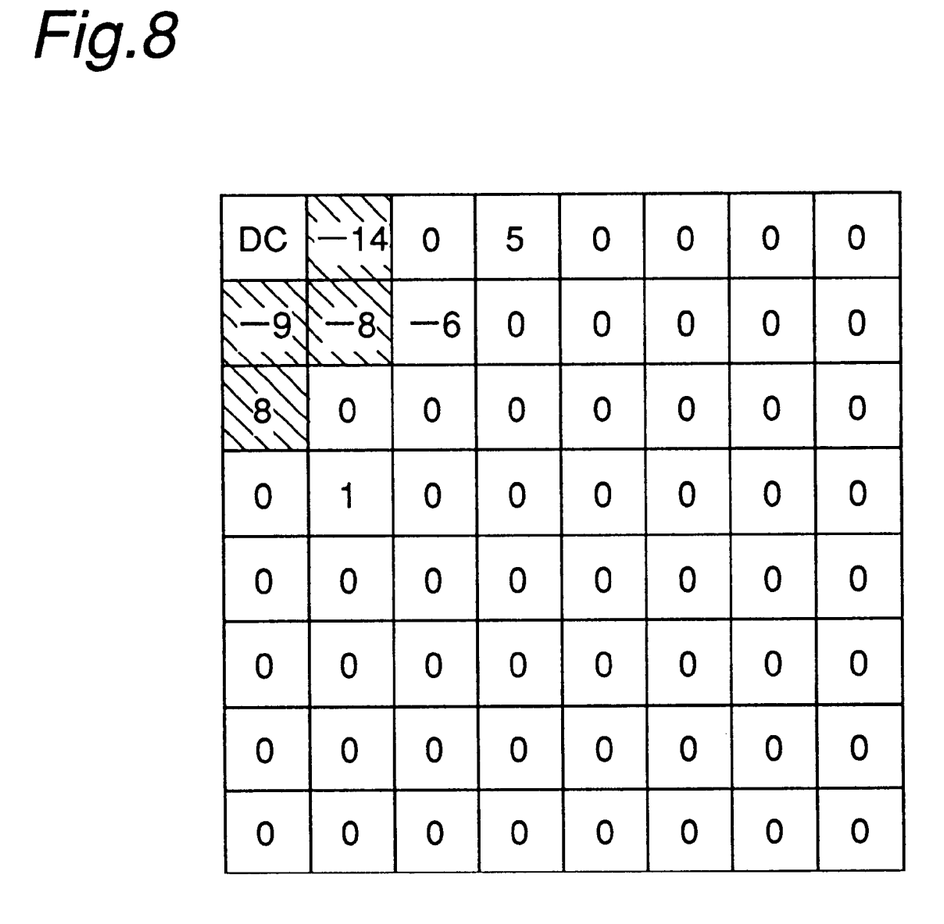
FIG. 8 shows an example of DCT coefficient data after being quantized in the present embodiments.

In the following, the characteristics of the present embodiment of a coding apparatus for image compression is compared with an apparatus of the JPEG. FIG. 8 shows an example of the DCT coefficient data after being quantized in the present embodiment. Table 1 is a look-up table of the 2-dimensional Huffman codes. Table 2 is the look-up table of the correspondence between the values of non-zero coefficient data and group numbers and the numbers of overhead bits. Table 3 shows an example of variable-length coding in a JPEG apparatus and the required number of bits. The results in Table 3 were obtained by performing the variable-length coding of the DCT coefficient data shown in FIG. 8.

TABLE 1

| Run-level symbol | 2-D Huffman code |
|---|---|
| EOB | 1010 |
| 0-1 | 00 |
| 0-2 | 01 |
| 0-3 | 100 |
| 0-4 | 1011 |
| 0-5 | 11010 |
| 0-6 | 111000 |
| 0-7 | 1111000 |
| 0-8 | 1111110110 |
| 0-9 | 1111111110000010 |
| 0-10 | 1111111110000011 |

TABLE 1-continued

| Run-level symbol | 2-D Huffman code |
|---|---|
| 1-1 | 1100 |
| 1-2 | 111001 |
| 1-3 | 1111001 |
| 1-4 | 111110110 |
| 1-5 | 11111110110 |
| 1-6 | 1111111110000100 |
| 1-7 | 1111111110000101 |
| 1-8 | 1111111110000110 |
| 1-9 | 1111111110000111 |
| 1-10 | 1111111110001000 |
| 2-1 | 11011 |
| 2-2 | 11111000 |
| 2-3 | 1111110111 |
| 2-4 | 1111111110001001 |
| 2-5 | 1111111110001010 |
| 2-6 | 1111111110001011 |
| 2-7 | 1111111110001100 |
| 2-8 | 1111111110001101 |
| 2-9 | 1111111110001110 |
| 2-10 | 1111111110001111 |
| 3-1 | 111010 |
| 3-2 | 111110111 |
| 3-3 | 11111110111 |
| 3-4 | 1111111110010000 |
| 3-5 | 1111111110010001 |
| 3-6 | 1111111110010010 |
| 3-7 | 1111111110010011 |
| 3-8 | 1111111110010100 |
| 3-9 | 1111111110010101 |
| 3-10 | 1111111110010110 |

TABLE 2

| Value of AC coefficient | Group number | Number of overhead bits |
|---|---|---|
| −1,1 | 1 | 1 |
| −3,−2,2,3 | 2 | 2 |
| −7,−6,−5,−4,4,5,6,7 | 3 | 3 |
| −15,−14, . . . ,−8,8, . . . ,14,15 | 4 | 4 |
| −31,−30, . . . ,−16,16, . . . ,30,31 | 5 | 5 |
| −63,−62, . . . ,−32,32, . . . ,62,63 | 6 | 6 |
| −127,−126, . . . ,−64,64, . . . ,126,127 | 7 | 7 |
| −255,−254, . . . ,−128,128, . . . 254,255 | 8 | 8 |
| −511,−510, . . . ,−256,256, . . . 510,511 | 9 | 9 |
| −1023,−1022, . . . ,−512,512, . . . ,1022,1023 | 10 | 10 |

TABLE 3

| Run-level symbol | 2-D Huffman code | Number of overhead bits |
|---|---|---|
| 0-4 | 1011(4bit) | 4bit |
| 0-4 | 1011(4bit) | 4bit |
| 0-4 | 1011(4bit) | 4bit |
| 0-4 | 1011(4bit) | 4bit |
| 1-3 | 1111001(7bit) | 3bit |
| 0-3 | 100(3bit) | 3bit |
| 3-1 | 111010(6bit) | 1bit |
| EOB | 1010(4bit) | |
| Total | 59bit | |

Table 4 shows the output data of the signal processing for variable-length coding in the present embodiment for the DCT coefficient data shown in FIG. 8. In Table 4, (a) shows the processing of dividing each of the netted 4 coefficient data of a low-frequency domain into a fixed-length data part of one bit and a variable-length data part of 10 bits. In Table 4 (b) shows the input data to symbol generating circuit 50, and (c) shows the variable-length coding of the AC components and the required number of bits.

TABLE 4

(a) Data division of 4 coefficient of a low-freguency domain

| Coefficient data (11bit) | Variable-length data part (10bit) | Fixed-length data part (1bit) |
|---|---|---|
| −14 (11111110010) | −7 (1111111001) | 0 |
| −9 (11111110111) | −5 (1111111011) | 1 |
| 8 (00000001000) | 4 (0000000100) | 0 |
| −8 (11111111000) | −4 (1111111100) | 0 |

(b) Input to the symbol generating circuit

| DC | −7 | 0 | 5 | 0 | 0 | 0 | 0 |
|---|---|---|---|---|---|---|---|
| −5 | −4 | −6 | 0 | 0 | 0 | 0 | 0 |
| 4 | 0 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

(c) The number of bits required for encoding the AC components

| Run-level symbol | 2-D Huffman code | Number of overhead bits | Fixed-length data part |
|---|---|---|---|
| 0-3 | 100(3bit) | 3bit | 0(1bit) |
| 0-3 | 100(3bit) | 3bit | 1(1bit) |
| 0-3 | 100(3bit) | 3bit | 0(1bit) |
| 0-3 | 100(3bit) | 3bit | 0(1bit) |
| 1-3 | 1111001(7bit) | 3bit | |
| 0-3 | 100(3bit) | 3bit | |
| 3-1 | 111010(6bit) | 1bit | |
| EOB | 1010(4bit) | | |
| Total | | 55bit | |

As seen from Tables 3 and 4, the encoding of the AC components requires 55 bits in the present embodiment, while the encoding of the AC components in a JPEG apparatus requires 59 bits. Therefore, the efficiency of encoding is improved in the present embodiment. Table 5 shows the correspondence between DCT coefficient data and the group numbers in a JPEG apparatus and the correspondence between the coefficient data and the variable-length data parts in the present embodiment.

TABLE 5

| JPEG Coefficient data | | Present embodiment | | |
|---|---|---|---|---|
| | | Variable-length data part | | Fixed length data part |
| [11bit] | No. | [10bit] | No. | [1bit] |
| . | . | . | . | . |
| . | . | . | . | . |
| . | . | . | . | . |
| 8(00000001000) | 4 | 4(0000000100) | 3 | 0 |
| 7(00000000111) | 3 | 3(0000000011) | 2 | 1 |
| 6(00000000110) | 3 | 3(0000000011) | 2 | 0 |
| 5(00000000101) | 3 | 2(0000000010) | 2 | 1 |
| 4(00000000100) | 3 | 2(0000000010) | 2 | 0 |
| 3(00000000011) | 2 | 1(0000000001) | 1 | 1 |
| 2(00000000010) | 2 | 1(0000000001) | 1 | 0 |
| 1(00000000001) | 1 | 0(0000000000) | — | 1 |

TABLE 5-continued

| JPEG Coefficient data | | Present embodiment | | |
|---|---|---|---|---|
| | | Variable-length data part | | Fixed length data part |
| [11bit] | No. | [10bit] | No. | [1bit] |
| 0(00000000000) | — | 0(0000000000) | — | 0 |
| −1(11111111111) | 1 | −1(1111111111) | 1 | 1 |
| −2(11111111110) | 2 | −1(1111111111) | 1 | 0 |
| −3(11111111101) | 2 | −2(1111111110) | 2 | 1 |
| −4(11111111100) | 3 | −2(1111111110) | 2 | 0 |
| −5(11111111011) | 3 | −3(1111111101) | 2 | 1 |
| −6(11111111010) | 3 | −3(1111111101) | 2 | 0 |
| −7(11111111001) | 3 | −4(1111111100) | 3 | 1 |
| −8(11111111000) | 4 | −4(1111111100) | 3 | 0 |
| . | . | . | . | . |
| . | . | . | . | . |
| . | . | . | . | . |

As seen from Table 5, the group number of a coefficient data in the present embodiment is almost always one less than the group number of the same coefficient data word in a JPEG apparatus, so that the number of overhead bits decreases by one. As the group numbers decline, shorter variable-length codes are assigned to the generated run-level symbols, so that efficiency is improved. The improvement in the number of bits is due to these shorter variable-length codes, and the decrease in the number of overhead bits are canceled by the increase in the number of bits required for the one-bit fixed-length data part.

As described above, according to the present embodiment, a data division means is provided for dividing each of the 4 coefficient data of a low-frequency domain of the AC components into a fixed-length data part of one bit and a variable-length data part of 10 bits. The fixed-length data parts are encoded into fixed-length codes, and the variable-length data parts are encoded into variable-length codes together with the remaining 59 coefficient data of the AC components. As a result, the efficiency of variable-length coding is improved, and the number of bits required for encoding the AC components is reduced.

Although, in the present embodiment, each lowest one bit of the 4 coefficient data of a low-frequency domain of the AC components is selected as a fixed-length data part, the number of coefficient data to be divided and the number of bits to be assigned to the fixed-length data part are not limited to these particulars. If they are varied depending on the characteristics of input image data and the quantization step or the order of DCT coefficient data, then further improvement can be expected.

Table 6 shows the output data of each section of signal processing in case the bit assignment for the fixed-length data part is changed. The number of coefficient data to be divided remains 4, and the number of bits assigned to the fixed-length data parts are 2, 2, 2, and 1.

TABLE 6

(a) Data division of 4 coefficient of a low-frequency domain

| Coefficient data (11bit) | Variable-length data part | Fixed-length data part |
|---|---|---|
| −14 (11111110010) | −4 (111111100) | 2 (10) |
| −9 (11111110111) | −3 (111111101) | 3 (11) |

TABLE 6-continued

| 8 | 2 | 0 |
|---|---|---|
| (00000001000) | (000000010) | (00) |
| −8 | −4 | 0 |
| (11111111000) | (111111100) | (0) |

(b) Input to the symbol generating circuit

| DC | −4 | 0 | 5 | 0 | 0 | 0 | 0 |
|---|---|---|---|---|---|---|---|
| −3 | −4 | −6 | 0 | 0 | 0 | 0 | 0 |
| 2 | 0 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

(c) The number of bits required for encoding the AC components

| Run-level symbol | 2-D Huffman code | Number of overhead bits | Fixed-length data part |
|---|---|---|---|
| 0-3 | 100(3bit) | 3bit | 10(2bit) |
| 0-2 | 01(2bit) | 2bit | 11(2bit) |
| 0-2 | 01(2bit) | 2bit | 00(2bit) |
| 0-3 | 100(3bit) | 3bit | 0(1bit) |
| 1-3 | 1111001(7bit) | 3bit | |
| 0-3 | 100(3bit) | 3bit | |
| 3-1 | 111010(6bit) | 1bit | |
| EOB | 1010(4bit) | | |
| Total | | 54bit | |

In Table 6, (a) shows the data division, (b) shows the variable-length data parts and the remaining 59 coefficient data of the AC components, which are input to symbol generating circuit 50, and (c) shows the 2-dimnensional Huffman coding of the AC components and the required number of bits. The results show the number of bits required for encoding the AC components declines to 54 bits, so that further improvement is achieved.

Figure 10:
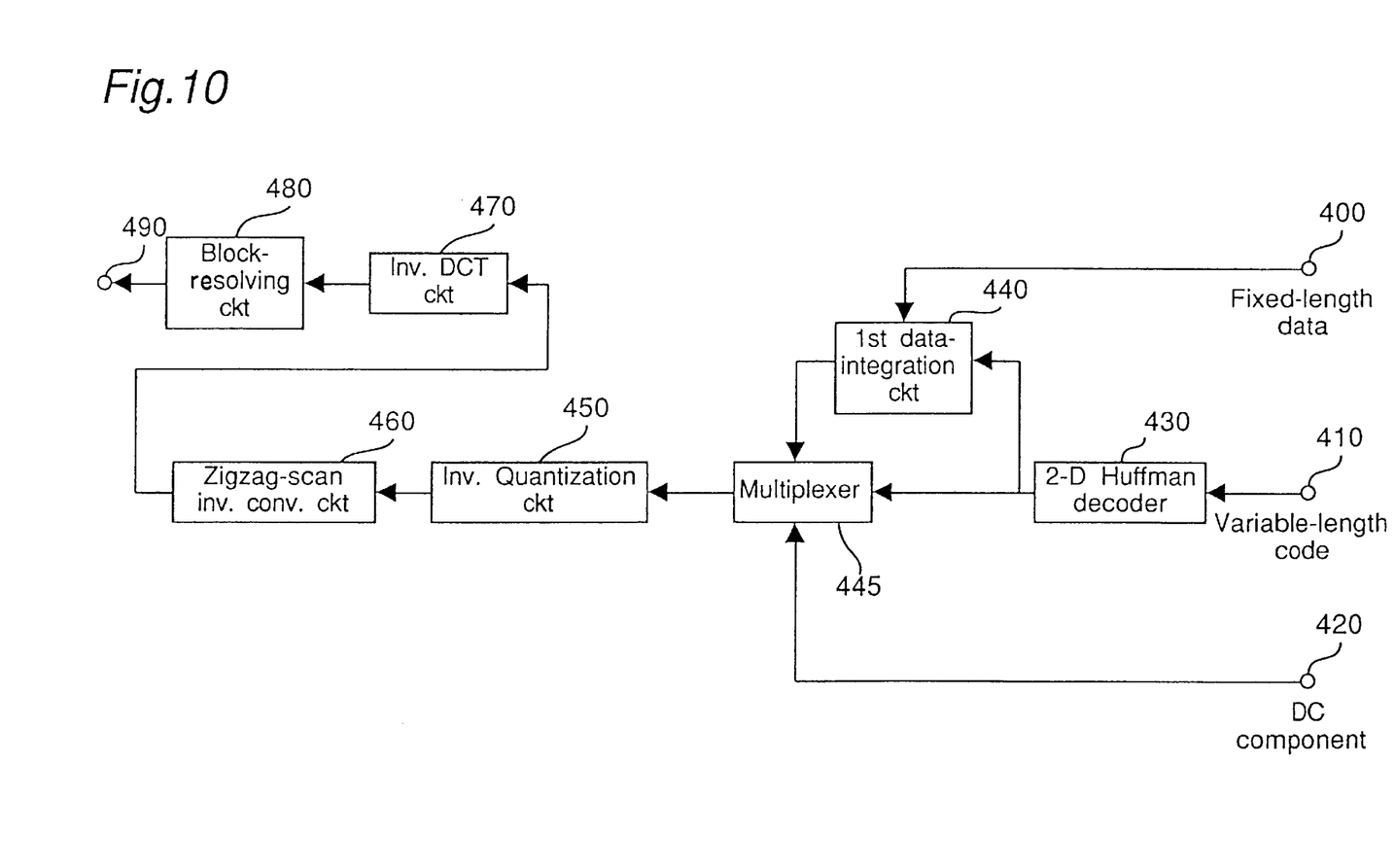
FIG. 10 is a block diagram of a decoding apparatus for decoding compression-coded data according to the present invention.

Next, an image decoding apparatus for decoding codes compression-coded according to the image compression-coding apparatus of the present invention will be explained herein below with reference to FIG. 10 showing a block diagram of the image decoding apparatus.

As shown in FIG. 10, the image decoding apparatus comprises an input terminal 400 of fixed-length data, an input terminal 410 of variable-length data, an input terminal 420 of a DC component, a 2-D Huffman decoding circuit 430 for decoding the input variable-length data into coefficient data, a data integration circuit 440 for integrating the fixed-length data and variable-length data input from the input terminals 400 and 410, respectively, a multiplexer 445 for multiplexing the DC component and the AC component of coefficient data, an inverse quantization circuit 450, a zigzag scan inverse conversion circuit 460, an inverse DCT circuit 470, a block-resolving circuit 480 for converting the blocked image signal into data of an original format input to the input terminal 410 and an output terminal 490 for outputting an output corresponding to the input image.

Figure 11:
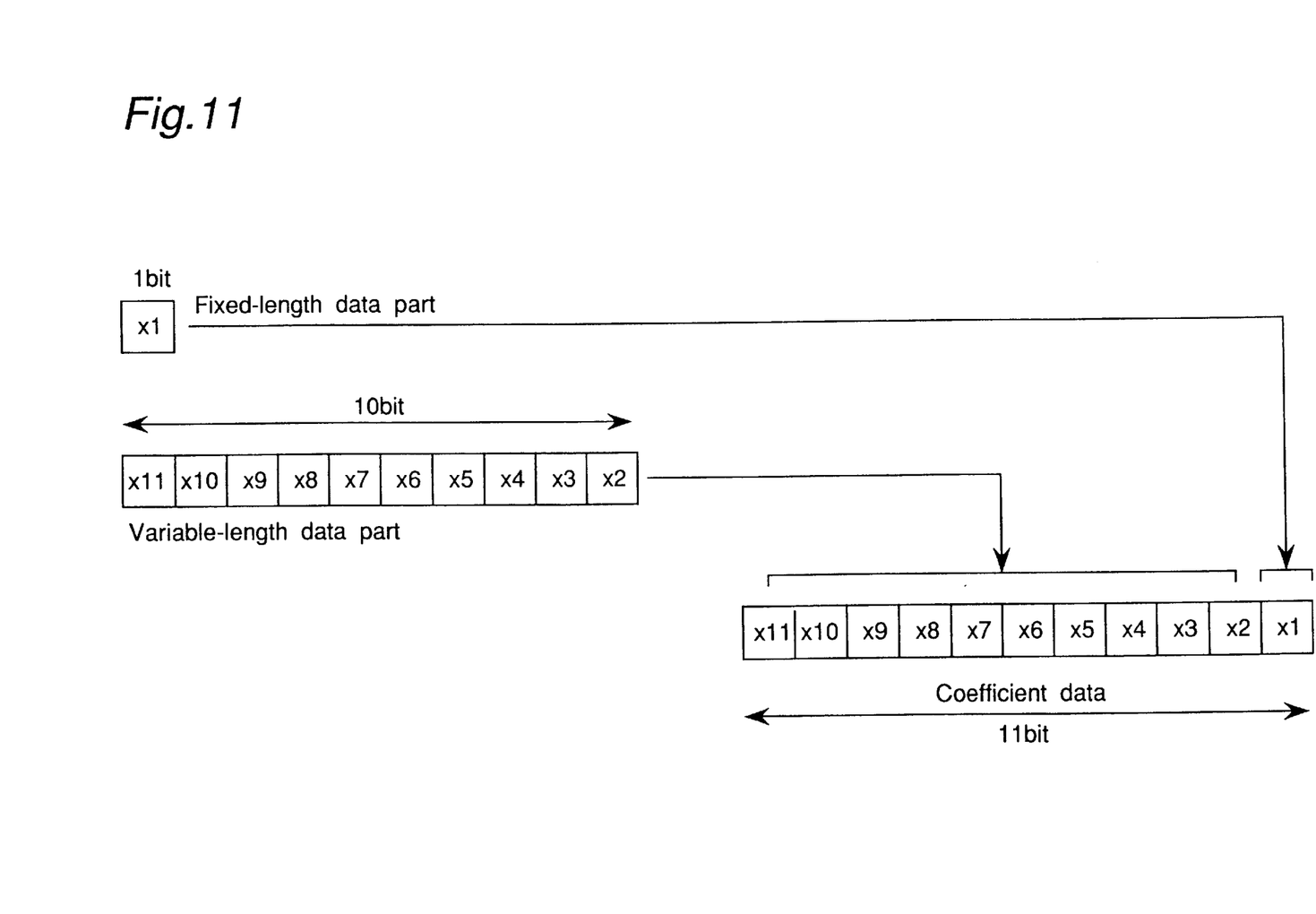
FIG. 11 is a conceptual schema for describing an integration operation of fixed-length data and variable-length data to be performed by the decoding apparatus of FIG. 10.

During the operation of the compression decoding apparatus, the variable-length codes input from the input terminal 410 are variable-length decoded by the 2-D Huffman decoding circuit 430 and output as coefficient data. Among the output coefficient data, the first four coefficients are output to the data integration circuit 440 and the remaining six coefficients being AC components are output to the multiplexer 445. The data integration circuit 440, as shown in FIG. 11, integrates fixed-length data of 1 bit input from the input terminal 400 and coefficient data of 10 bits decoded by the 2-D Huffman decoding circuit 400 and outputs a coefficient data of 11 bits with a sign to the multiplexer 445.

The multiplexer 445 multiplexes a DC component input from the input terminal 420, the first four coefficient data bits of a zigzag scan data input from the integration circuit 440 and the remaining coefficient data and the multiplexed data are output to the inverse quantization circuit 450. The inverse quantization circuit 450 inverse-quantizes the quantized coefficient data and outputs it to the zigzag-scan inverse conversion circuit 460. The zigzag-scan inverse conversion circuit 460 rearranges the DCT coefficients once arranged in the order shown in FIG. 6 to the original order and outputs it to the inverse DCT circuit 470. The inverse DCT circuit 470 converts the DCT conversion coefficients to an image data forming a block, and the block resolving circuit 480 converts the image data divided into blocks into the original format as input to the input terminal 1 and outputs the converted image data through the output terminal 490.

Thus, the image data decoding apparatus having the above mentioned composition is able to decode an output signal from the image data compression-coding apparatus input divided into fixed-length and variable-length coded blocks and to obtain decoded image data.

Figure 2:
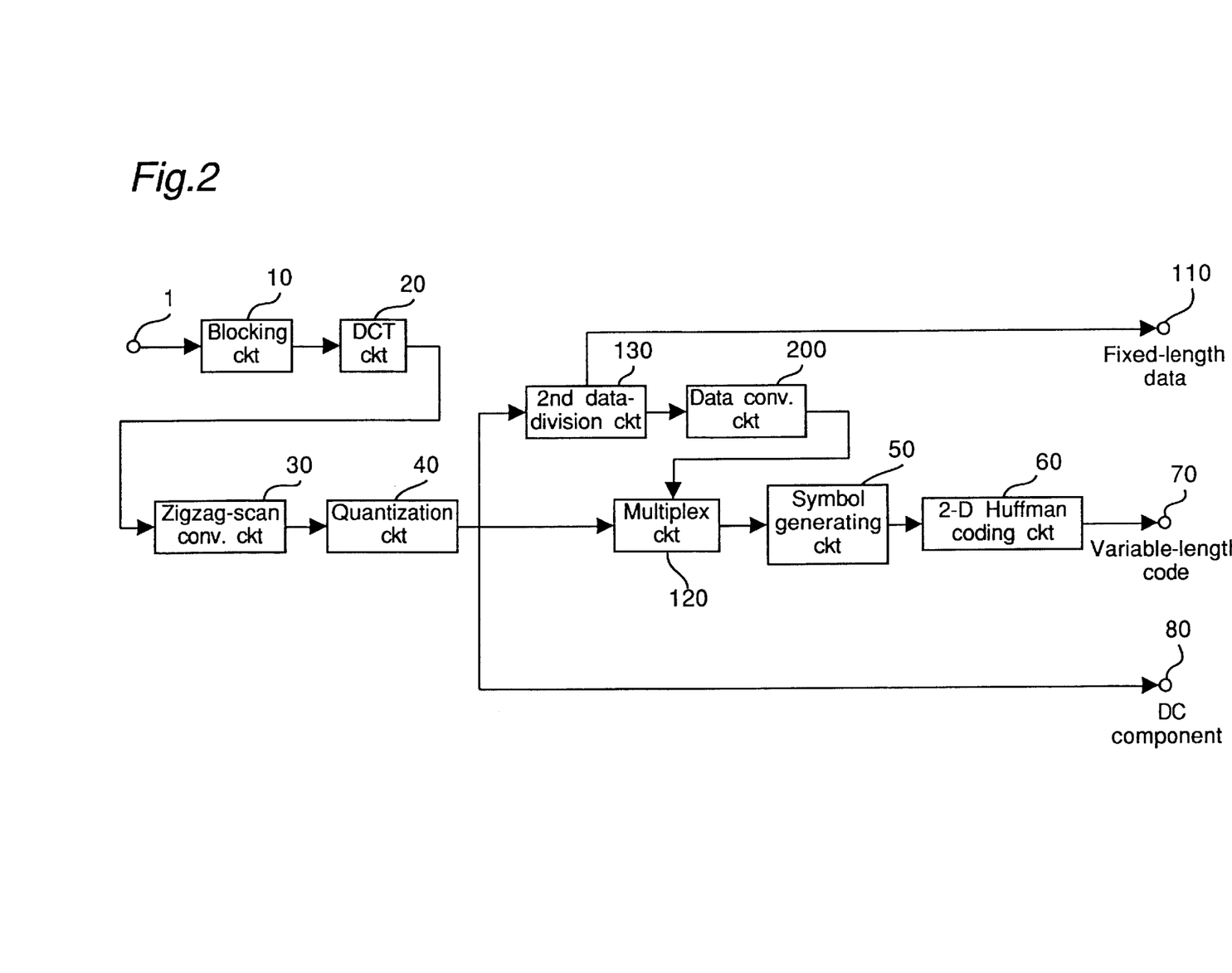
FIG. 2 is a block diagram of a coding apparatus for image compression of a second embodiment in accordance with the present invention.

The following is a description of the second embodiment; in accordance with the present invention with reference to the accompanying drawings. FIG. 2 is a block diagram of a coding apparatus for image compression of the present embodiment. In FIG. 2, a block that has the same function as a block in FIG. 1 is denoted by the same numeral.

In FIG. 2, element 130 is a second data-division circuit that divides each coefficient data word corresponding to a low-frequency domain into a fixed-length data part including the sign bit and a variable-length data part, and element 200 is a data conversion circuit that converts the variable-length data parts.

The operation of the coding apparatus for image compression composed as above is described in the following with reference to FIG. 2. First, image data input through input terminal 1 is segmented into 8×8 or matrices blocks by the blocking circuit 10 and is transformed into 8×8 (=64) DCT coefficients by the DCT circuit 20. The DCT coefficients are reordered by the zigzag-scanning conversion circuit 30 and are output in the zigzag-scanning order, and are quantized by the quantization circuit 40.

The DC component of the quantized DCT coefficients is encoded into a fixed-length code and output to the output terminal 80. Of the AC components of the quantized DCT coefficients, the first 4 coefficient data in the zigzag-scanning order, which correspond to a low-frequency domain, are output to the second data-division circuit 130, and the remaining coefficient data of the AC components are output to the multiplexer 120.

The second data-division circuit 130 divides an input coefficient data word (consisting of 11 bits including a sign bit) into a fixed-length data part consisting of a sign bit and a variable-length data part consisting of the remaining 10 bits. The variable-length data part is output to the data conversion circuit 200, and the fixed-length data part is output to the output terminal 110. The data conversion circuit 200 performs the following data conversion depending on the lowest bit of the input variable-length data part.

If the lowest bit is 1, then the lowest bit is discarded and the remaining 9 bits are inverted. If the lowest bit is 0, then the lowest bit is discarded. The variable-length data parts converted in this way and the remaining coefficient data of the AC components other than the 4 coefficient data of a low-frequency domain are multiplexed by the multiplexing circuit 120, and output to the symbol generating circuit 50. The symbol generating circuit 50 processes the converted variable-length data part of the 4 coefficient data and the remaining 59 coefficient data as in a JPEG apparatus. Finally the 2-D Huffman coding circuit 60 outputs a variable-length code to the output terminal 70.

In the following, the characteristics of the present embodiment of a coding apparatus for image compression is compared with an apparatus of the JPEG. Table 7 shows the output data of the signal processing for variable-length coding in the present embodiment for the DCT coefficient data shown in FIG. 8.

TABLE 7

(a) Data division of 4 coefficients of a low-frequency domain

| Coefficient data (11bit) | Fixed-length data part (1bit) | Variable-length data part (10bit) | Converted variable-length data part (9bit) |
|---|---|---|---|
| −14 (11111110010) | 1 (1) | −14 (1111110010) | −7 (111111001) |
| −9 (11111110111) | 1 (1) | −9 (1111110111) | 4 (000000100) |
| 8 (00000001000) | 0 (0) | 8 (0000001000) | 4 (000000100) |
| −8 (11111111000) | 1 (0) | −8 (1111111000) | −4 (111111100) |

(b) Input to the symbol generating circuit

| DC | −7 | 0 | 5 | 0 | 0 | 0 | 0 |
|---|---|---|---|---|---|---|---|
| 4 | −4 | −6 | 0 | 0 | 0 | 0 | 0 |
| 4 | 0 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

(c) The number of bits required for encoding the AC components

| Run-level symbol | 2-D Huffman code | Number of overhead bits | Fixed-length data part |
|---|---|---|---|
| 0-3 | 100(3bit) | 3bit | 1(1bit) |
| 0-3 | 100(3bit) | 3bit | 1(1bit) |
| 0-3 | 100(3bit) | 3bit | 0(1bit) |
| 0-3 | 100(3bit) | 3bit | 1(1bit) |
| 1-3 | 1111001(7bit) | 3bit | |
| 0-3 | 100(3bit) | 3bit | |
| 3-1 | 111010(6bit) | 1bit | |
| EOB | 1010(4bit) | | |
| Total | | 55bit | |

In Table 7, (a) shows the processing of dividing the netted 4 coefficients of a low-frequency domain into a fixed-length data part of one sign bit and a variable-length data part of 10 bits. In Table 7, (b) shows the converted variable-length data part and the remaining 59 coefficient data of the AC components, which are input to symbol generating circuit 50. In Table 7, (c) shows the variable-length coding of the AC components and the required number of bits.

As seen from Table 3, which shows the number of bits required for variable-length coding in a JPEG apparatus, and Table 7, the encoding of the AC components requires 55 bits in the present embodiment, while the encoding of the AC components in a JPEG apparatus requires 59 bits. Therefore, the efficiency of encoding is improved in the present embodiment.

Table 8 shows the correspondence between DCT coefficient data and the group numbers in the JPEG apparatus and the correspondence between the coefficient data and the variable-length data parts in the present embodiment.

TABLE 8

| | | Present embodiment | | |
|---|---|---|---|---|
| JPEG Coefficient | | Variable-length data part | | Fixed length data part |
| [11bit] | No. | [9bit] | No. | [1bit] |
| . | . | . | . | . |
| . | . | . | . | . |
| . | . | . | . | . |
| 8(00000001000) | 4 | 4(000000100) | 3 | 0 |
| 7(00000000111) | 3 | −4(111111100) | 3 | 0 |
| 6(00000000110) | 3 | 3(000000011) | 2 | 0 |
| 5(00000000101) | 3 | −3(111111101) | 2 | 0 |
| 4(00000000100) | 3 | −2(000000010) | 2 | 0 |
| 3(00000000011) | 2 | −2(111111110) | 2 | 0 |
| 2(00000000010) | 2 | 1(000000001) | 1 | 0 |
| 1(00000000001) | 1 | −1(112111111) | 1 | 0 |
| 0(00000000000) | — | 0(000000000) | — | 0 |
| −1(11111111111) | 1 | 0(000000000) | — | 1 |
| −2(11111111110) | 2 | −1(111111111) | 1 | 1 |
| −3(11111111101) | 2 | 1(000000001) | 1 | 1 |
| −4(11111111100) | 3 | −2(111111110) | 2 | 1 |
| −5(11111111011) | 3 | 2(000000010) | 2 | 1 |
| −6(11111111010) | 3 | −3(111111101) | 2 | 1 |
| −7(11111111001) | 3 | 3(000000011) | 2 | 1 |
| −8(11111111000) | 4 | −4(111111100) | 3 | 1 |
| . | . | . | . | . |
| . | . | . | . | . |
| . | . | . | . | . |

As seen from Table 8, the group number of a coefficient data in the present embodiment is almost always one less than the group number of the same coefficient data in the JPEG apparatus, so that the number of overhead bits decreases by one. As the group numbers decline, shorter variable-length codes are assigned to the generated run-level symbols, so that efficiency is improved. The improvement in the number of bits is due to these shorter variable-length codes, and the decrease in the number of overhead bits are canceled by the increase in the number of bits required for the one-bit fixed-length data part.

In order to recover the original coefficient data, each of the converted variable-length data parts are first reproduced, and the result is combined with the corresponding fixed-length data part. The reproduction of variable-length data part is described in the following with reference to Table 8.

If the exclusive OR of a converted variable-length data part and the sign bit of a corresponding fixed-length data part is the logical value 1, then the converted variable-length data part is inverted, then shifted left by one bit, and the lowest bit is made 1. For example, if the converted variable-length data part is −4, and the sign bit of the fixed-length data part is 0, then the converted variable-length data part becomes 3 by inversion, and then becomes 6 by one-bit left shift, and becomes 7, which is the original coefficient data word, by the addition of 1 in the lowest bit.

If the exclusive OR of a converted variable-length data part and the sign bit of a corresponding fixed-length data part is the logical value 0, then the converted variable-length data part is shifted left by one bit, and the lowest bit is made 0. For example, if the converted variable-length data part is 4, and the sign bit of the fixed-length data part is 0, then the converted variable-length data part becomes 8 by the one-bit left shift, and becomes 8, which is the original coefficient data word, by the addition of 1 in the lowest bit. The other converted variable-length data parts are similarly reconverted to the original variable-length data parts.

As described above, according to the present embodiment, a data division means is provided for dividing each of the 4 coefficient data of a low-frequency domain of the AC components into a fixed-length data part of one sign bit and a variable-length data part of 10 bits and a data conversion means is provided for converting the variable-length data part. The fixed-length data part is encoded into a fixed-length code, and the converted variable-length data parts are encoded into variable-length codes together with the remaining 59 coefficient data of the AC components. As a result, efficiency of variable-length coding is improved, and the number of bits required for encoding the AC components is reduced.

In the present embodiment, each sign bit of the 4 coefficient data words of a low-frequency domain of the AC components is selected as a fixed-length data part, and no lower bits were assigned to the fixed data part. However, the number of bits to be assigned to the fixed-length data part is not limited to this particular. FIG. 8 shows the output data of each section of signal processing in case the bit assignment for fixed-length data parts is changed. The number of coefficient data to be divided remains 4, and in addition to the sign bit, the number of the lowest bits assigned to the fixed-length data parts are 1, 1, 1, and 0.

TABLE 9

(a) Data division of 4 coefficients of a low-frequency domain

| Coefficient data part (11bit) | Fixed-length data part | Variable-length data part | Converted variable-length data part |
|---|---|---|---|
| −14 (11111110010) | 2 (10) | −7 (111111001) | 3 (00000011) |
| −9 (11111110111) | 3 (11) | −9 (111111011) | 2 (00000010) |
| 8 (00000001000) | 0 (00) | 8 (000000100) | 2 (000Q0010) |
| −8 (11111111000) | 1 (1) | −8 (1111111000) | −4 (111111100) |

(b) Input to the symbol generating circuit

| DC | 3 | 0 | 5 | 0 | 0 | 0 | 0 |
|---|---|---|---|---|---|---|---|
| 2 | −4 | −6 | 0 | 0 | 0 | 0 | 0 |
| 2 | 0 | 0 | 0 | 0 | 0 | 0 | 0 |
| 0 | 1 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

(c) The number of bits required for encoding the AC components

| Run-level symbol | 2-D Huffman code | Number of overhead bits | Fixed-length data part |
|---|---|---|---|
| 0-2 | 01(2bit) | 2bit | 2(2bit) |
| 0-2 | 01(2bit) | 2bit | 3(2bit) |
| 0-2 | 01(2bit) | 2bit | 0(2bit) |
| 0-3 | 100(3bit) | 3bit | 1(1bit) |
| 1-3 | 1111001(7bit) | 3bit | |
| 0-3 | 100(3bit) | 3bit | |
| 3-1 | 111010(6bit) | 1bit | |
| E0B | 1010(4bit) | | |
| Total | | 52bit | |

In Table 9, (a) shows the data division, the converted variable-length data parts, and the fixed data parts. In Table 9 (b) shows the variable-length data parts and the remaining 59 coefficient data of the AC components to be input to symbol generating circuit 50, and (c) shows the 2-dimensional Huffman coding of the AC components and the required number of bits. The results show the number of bits required for encoding the AC components declines to 52 bits, so that further improvement is achieved.

Figure 3:
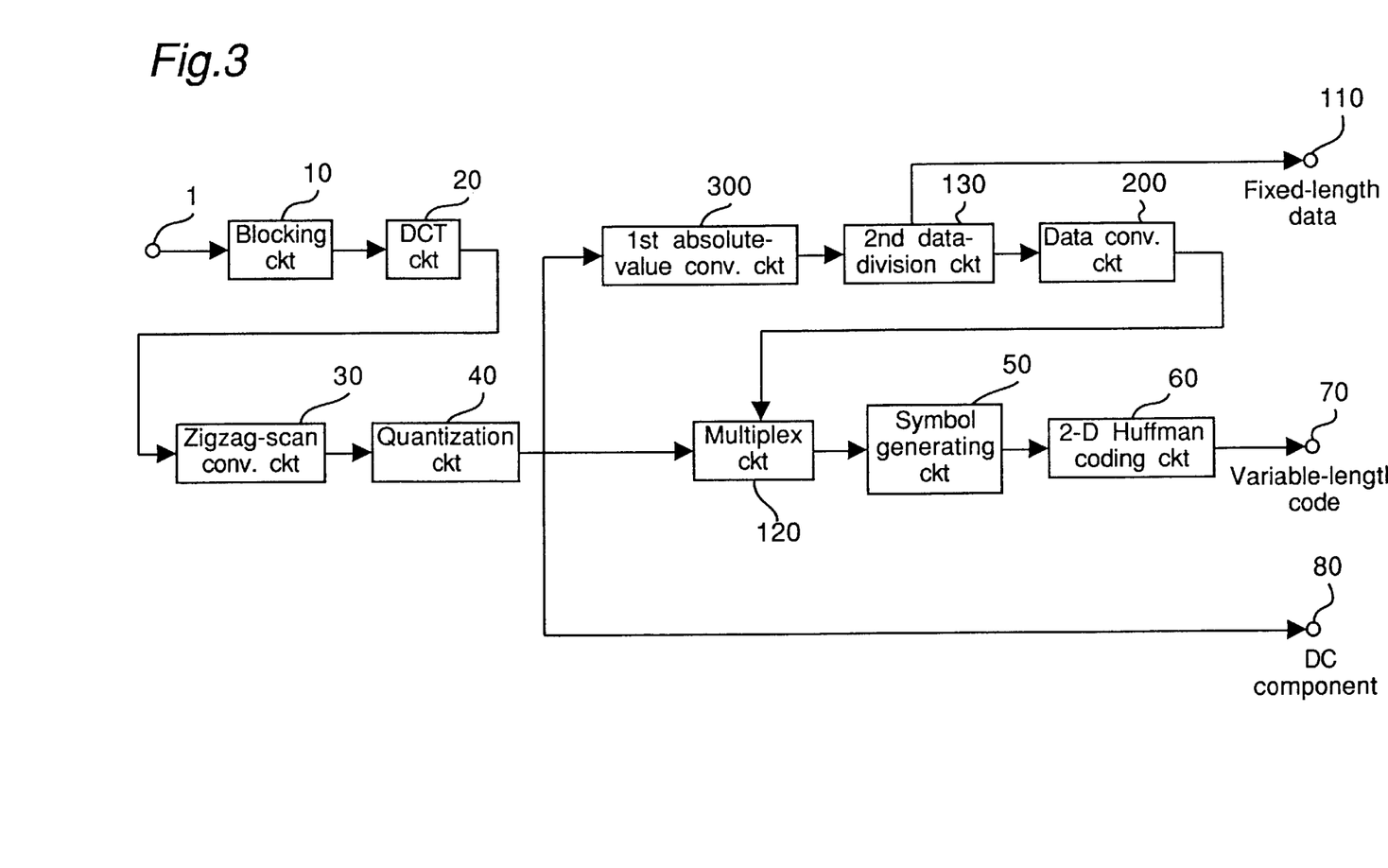
FIG. 3 is a block diagram of a coding apparatus for image compression of a third embodiment in accordance with the present invention.

The following is a description of the third embodiment in accordance with the present invention with reference to the accompanying drawings. FIG. 3 is a block diagram of a coding apparatus for image compression of the present embodiment. In FIG. 3, a block that has the same function as a block in FIGS. 1 and 2 is denoted by the same numeral.

In FIG. 3, element 300 is a first absolute-value conversion circuit that converts a coefficient data word into its sign bit and its absolute value.

The operation of the coding apparatus for image compression composed as above is described in the following with reference to FIG. 3. First, image data input through the input terminal 1 is segmented into an 8×8 block or matrix by the blocking circuit 10 and is transformed into 8×8 (=64) DCT coefficients by the DCT circuit 20. The DCT coefficients are reordered by the zigzag-scanning conversion circuit 30 and output in the zigzag-scanning order as shown in FIG. 5, and are quantized by the quantization circuit 40. The DC component of the quantized DCT coefficients is encoded into a fixed-length code and output to the output terminal 80. Of the AC components of the quantized DCT coefficients, the first 4 coefficient data bits in the zigzag-scanning order, which correspond to a low-frequency domain, are first converted into a data word expressed by the combination of its sign bit and its absolute value and then output to the second data-division circuit 130, and the remaining coefficient data words of the AC components are output to the multiplexing circuit 120.

Figure 9:
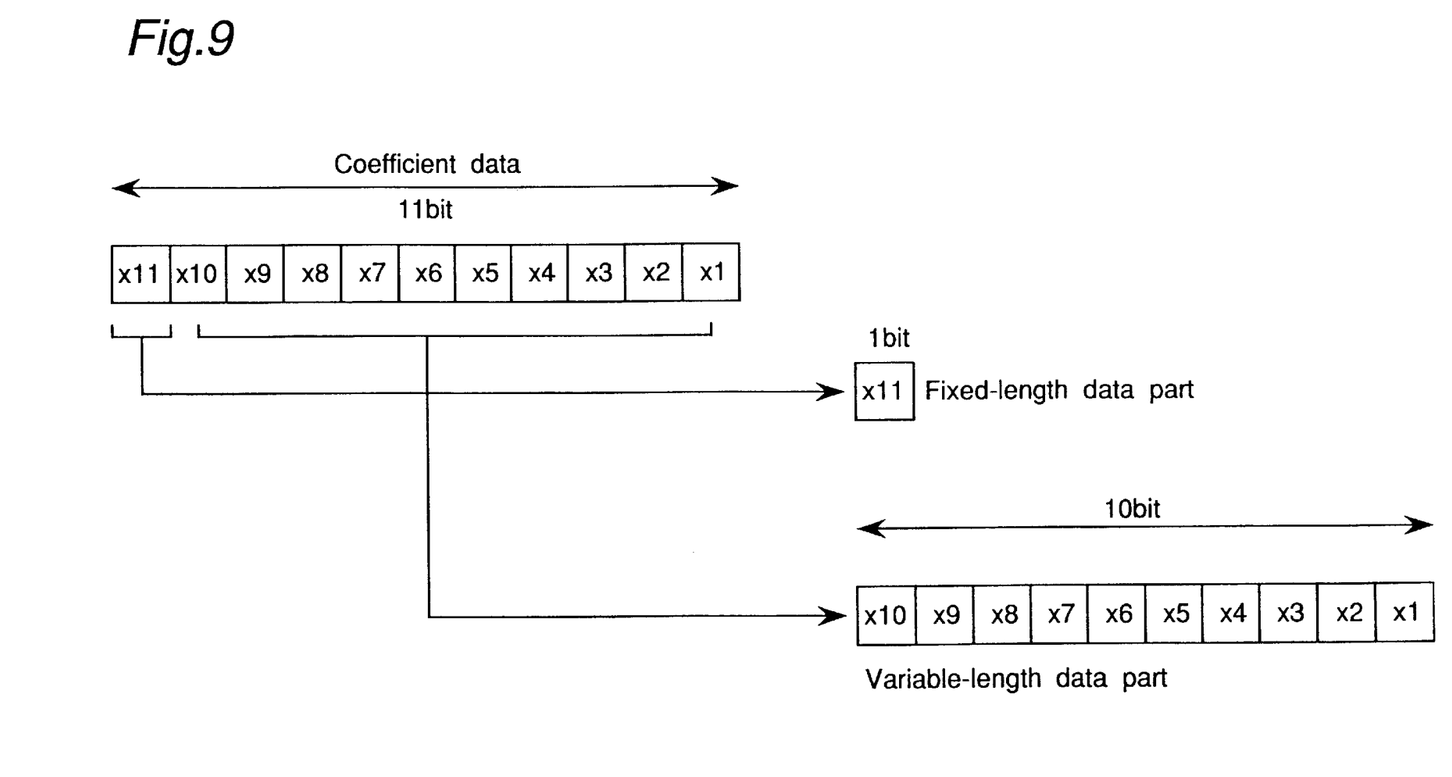
FIG. 9 is a conceptual schema for describing the operation of a second data-division circuit in the present embodiments.

As shown in FIG. 9, the second data-division circuit 130 divides an input data word (consisting of one sign bit and 10 absolute-value bits) into a fixed-length data part consisting of the sign bit and a variable-length data part consisting of the remaining 10 bits expressing the absolute value. The variable-length data part is output to the data conversion circuit 200, and the fixed-length data part is output to the output terminal 110. The data conversion circuit 200 performs the following data conversion depending on the lowest bit of the input variable-length data part.

If the lowest bit is 1, then the lowest bit is discarded and the remaining 9 bits are inverted. If the lowest bit is 0, then the lowest bit is discarded. The variable-length data parts converted in this way and the remaining 59 coefficient data words of the AC components other than the 4 coefficient data words of a low-frequency domain are multiplexed by the multiplexing circuit 120 and converted to 2-dimensional Huffman codes through the symbol generating circuit 50 and the 2-D Huffman coding circuit 60 and are output to the terminal 70.

The present embodiment performs data conversion in the first absolute-value conversion circuit 300 as pre-processing for the second data division circuit 130 in the second embodiment. Table 10 shows the correspondence between DCT coefficient data and the group numbers in the JPEG apparatus and the correspondence between the coefficient data and the variable-length data parts in the present embodiment.

TABLE 10

| JPEG Coefficient | | Present embodiment | | |
|---|---|---|---|---|
| | | Variable-length data part | | Fixed length data part |
| [11bit] | No. | [9bit] | No. | [1bit] |
| . | . | . | . | . |
| . | . | . | . | . |
| . | . | . | . | . |
| 8(00000001000) | 4 | 4(000000100) | 3 | 0 |
| 7(00000000111) | 3 | −4(111111100) | 3 | 0 |
| 6(00000000110) | 3 | 3(000000011) | 2 | 0 |
| 5(00000000101) | 3 | −3(111111101) | 2 | 0 |
| 4(00000000100) | 3 | 2(000000010) | 2 | 0 |
| 3(00000000011) | 2 | −2(111111110) | 2 | 0 |
| 2(00000000010) | 2 | 1(000000001) | 1 | 0 |
| 1(00000000001) | 1 | −1(111111111) | 1 | 0 |
| 0(00000000000) | — | 0(000000000) | — | 0 |
| −1(11111111111) | 1 | −1(000000000) | 1 | 1 |
| −2(11111111110) | 2 | 1(111111111) | 1 | 1 |
| −3(11111111101) | 2 | −2(111111110) | 2 | 1 |
| −4(11111111100) | 3 | 2(000000010) | 2 | 1 |
| −5(11111111011) | 3 | −3(111111101) | 2 | 1 |
| −6(11111111010) | 3 | 3(000000011) | 2 | 1 |
| −7(11111111001) | 3 | −4(111111100) | 3 | 1 |
| −8(11111111000) | 4 | 4(000000100) | 3 | 1 |
| . | . | . | . | . |
| . | . | . | . | . |
| . | . | . | . | . |

As seen from Table 10, the group number of a coefficient data word in the present embodiment is almost always one less than the group number of the same coefficient data word in the JPEG apparatus, so that the number of overhead bits decreases by one. As the group numbers decline, shorter variable-length codes are assigned to the generated run-level symbols, so that efficiency is improved.

As described above, according to the present embodiment, an absolute-value conversion means is provided for obtaining the absolute values of the 4 coefficient data words of a low-frequency domain of the AC components, a data division means is provided for dividing an input data word into a fixed-length data part of one sign bit and a variable-length data part of 10 bits expressing the absolute value, and a data conversion means is provided for converting the variable-length data part. The fixed-length data part is encoded into a fixed-length code, and the variable-length data parts are encoded into variable-length codes together with the remaining 59 coefficient data words of the AC components. As a result, the efficiency of variable-length coding is improved, and the number of bits required for encoding the AC components is reduced.

Although, in the present embodiment, each one sign bit of the 4 coefficient data words of a low-frequency domain of the AC components is selected as a fixed-length data part, the number of coefficient data words to be divided and the number of bits to be assigned to the fixed-length data part are not limited to these particulars.

Figure 4:
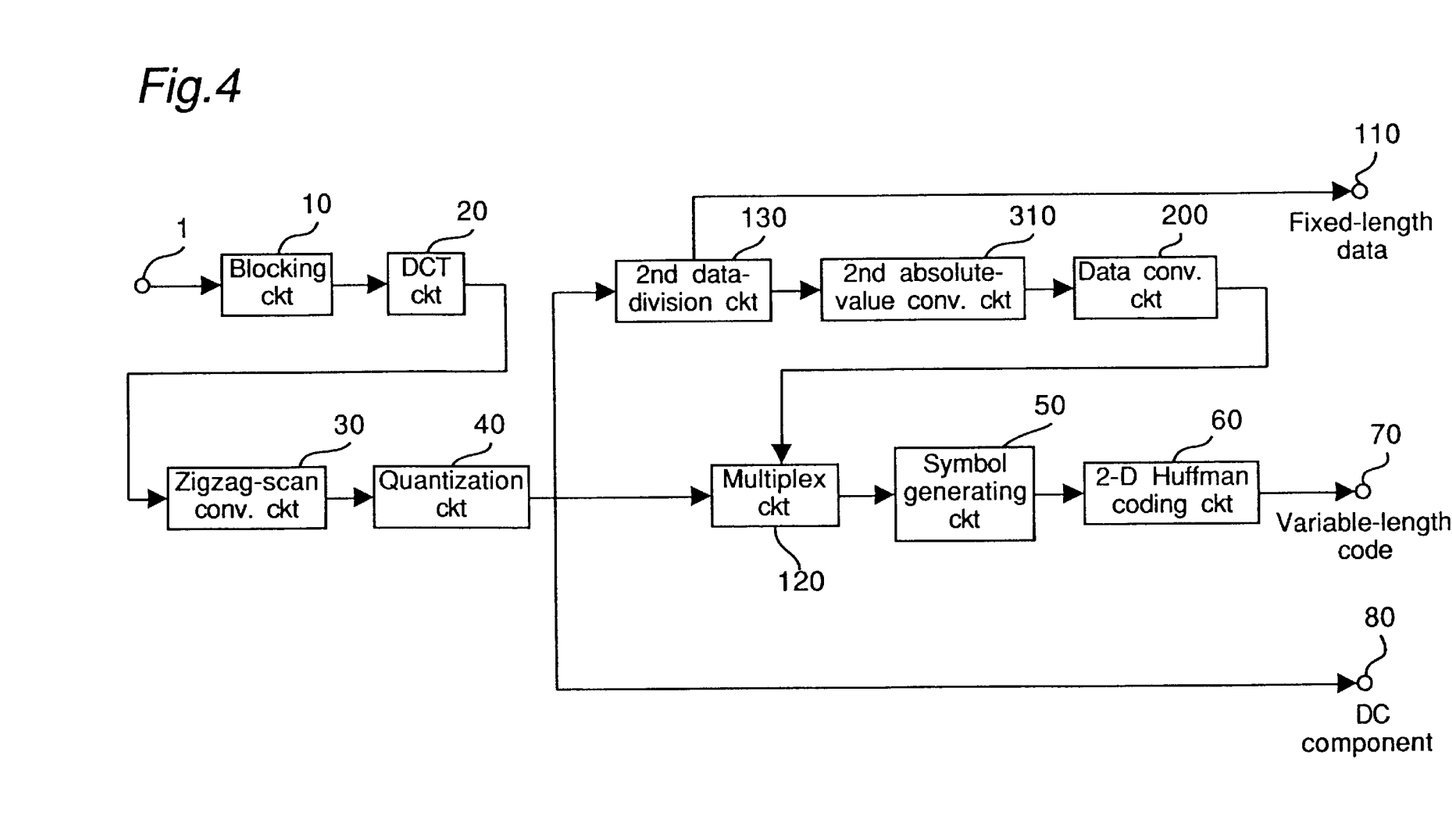
FIG. 4 is a block diagram of a coding apparatus for image compression of a fourth embodiment in accordance with the present invention.

A fourth embodiment in accordance with the present invention is described in the following with reference to the accompanying drawings. FIG. 4 is a block diagram of a coding apparatus for image compression of the present embodiment. In FIG. 4, a block that has the same function as a block in FIGS. 1, 2, and 3 is denoted by the same numeral. In FIG. 4, element 310 is a second absolute-value conversion circuit that converts a variable-length data part into its absolute value.

The operation of the coding apparatus for image compression composed as above is described as follows with reference to FIG. 4. First, image data input through the input terminal 1 is segmented into 8×8 blocks or matrices by the blocking circuit 10 and is transformed into 8×8 (=64) DCT coefficients by the DCT circuit 20. The DCT coefficients are reordered by zigzag-scanning conversion circuit 30 and output in the zigzag-scanning order, and are quantized by the quantization circuit 40. The DC component of the quantized DCT coefficients is encoded into a fixed-length code and output to the output terminal 80. Of the AC components of the quantized DCT coefficients, each of the first 4 coefficient data words in the zigzag-scanning order, which correspond to the a low-frequency domain, is input to second data-division circuit 130, and the remaining coefficient data words of the AC components are output to the multiplexing circuit 120.

As shown in FIG. 9, second data-division circuit 130 divides an input data word (consisting of one sign bit and 10 absolute-value bits) into a fixed-length data part consisting of the sign bit and a variable-length data part consisting of the remaining 10 bits. The variable-length data part is output to the second absolute-value conversion circuit 310, and the fixed-length data part is output to the output terminal 110.

The second absolute-value conversion circuit 310 converts the input variable-length data part into its absolute value based on the sign bit and outputs the result to the data conversion circuit 200. The data conversion circuit 200 performs the following data conversion depending on the lowest bit of the input variable-length data part. If the lowest bit is 1, then the lowest bit is discarded and the remaining 9 bits are inverted. If the lowest bit is 0, then the lowest bit is discarded. The variable-length data parts converted in this way is output to the symbol generating circuit 50 via the multiplexing circuit 120.

The symbol generating circuit 50 processes the converted variable-length data parts of the 4 coefficients and the 59 coefficient data words of the remaining AC components as in the first, second, and third embodiments to output overhead bits and run-level symbols. The 2-D Huffman coding circuit 60 outputs a variable-length code for each run-level symbol and its overhead bits. The present embodiment performs data conversion in the second absolute-value conversion circuit 310 as post-processing for the second data-division circuit 130 in the second embodiment.

In the present embodiment, since the fixed-length data part consists of one sign bit, the correspondence between the coefficient data words and the variable-length data parts is the same as in the third embodiment as shown in Table 10. However, if lower bits of the coefficient data word are assigned to its fixed-length data part in addition to its sign bit, the correspondence table becomes different from Table 10. As in the third embodiment, the group number of a coefficient data word in the present embodiment is often less than the group number of the same coefficient data word in the JPEG apparatus, so that the number of overhead bits decreases by one. As the group numbers decline, the shorter variable-length codes are assigned to the generated run-level symbols, so that the efficiency is improved.

As described above, according to the present embodiment, a data division means is provided for dividing each of the 4 coefficient data words of a low-frequency domain of the AC components into a fixed-length data part of one sign bit and a variable-length data part of 10 bits, an absolute-value conversion means for converting each variable-length data part into the absolute value of the coefficient data word, and a data conversion means for converting the absolute value of the variable-length data part. The fixed-length data part is encoded into a fixed-length code, and the converted variable-length data parts are encoded into variable-length codes together with the remaining 59 coefficient data words of the AC components. As a result, the efficiency of variable-length coding is improved, and the number of bits required for encoding the AC components is reduced.

Although, in the present embodiment, each one sign bit of the 4 coefficient data words of a low-frequency domain of the AC components is selected as a fixed-length data part, the number of coefficient data words to be divided and the number of bits to be assigned to the fixed-length data part are not limited to these particulars.

Further, in the present first to fourth embodiments, the input image data was transformed by a DCT. However, the image data can be data representing the difference between two frames, and the method of transformation can be other than a DCT. For example, an LOT, subband coding, and a wavelet transform can be applied to obtain similar effects.

Although the present invention has been fully described in connection with the preferred embodiments thereof with reference to the accompanying drawings, it is to be noted that various changes and modifications are apparent to those skilled in the art. Such changes and modifications are to be understood as being included within the scope of the present invention as defined by the appended claims unless they depart therefrom.

What is claimed is:

1. A coding apparatus for image compression comprising:
   a transform means for transforming image data into a plurality of transform coefficients arranged in a matrix;
   a quantization means for quantizing each of said transform coefficients into quantized coefficient data of predetermined number of x bits;
   a data division means for dividing said quantized coefficient data into a first data bit part of y bits (y<x) which is to be fixed-length encoded and a second data bit part of (x−y) bits which is to be variable-length encoded, wherein the number y is predetermined in accordance with an order (i,j) of each of said quantized coefficient data ($C_{ij}$); and
   a variable-length coding means for encoding said second data bit part into a variable-length code.

2. The coding apparatus for image compression as defined in claim 1, wherein said first data bit part consists of lower y bits of the coefficient data (y≧1).

3. The coding apparatus for image compression as defined in claim 2, wherein the bit number y of said first data bit part is fixed at a predetermined number.

4. The coding apparatus for image compression as defined in claim 2, wherein the bit number y of each of said first data bit parts is determined in accordance with an order of one of said transform coefficients which corresponds to said first data bit part, wherein said order defines positions of said transform coefficients in the matrix, and wherein the bit number y is different for said first data bit parts of at least two of said transform coefficients.

5. A coding apparatus for image compression comprising:
   a transform means for transforming image data into a plurality of transform coefficients arranged in a matrix;
   a quantization means for quantizing said transform coefficients into a respective plurality of coefficient data each having a predetermined number of bits;
   a data division means for dividing each of said quantized coefficient data into a first data bit part, which is to be fixed-length encoded, consisting of a sign bit and lower z bits of said coefficient data (z≧0) and a second data bit part, which is to be variable-length encoded, consisting of the remaining bits of said coefficient data;
   a data conversion means for discarding the lowest bit of said second data bit part and then inverting each bit of the result if the lowest bit of said second data bit part is a logical 1 and, if the lowest bit of said second data bit part is a logical 0, discarding the lowest bit of said second data bit part; and
   a variable-length coding means for encoding the converted second data bit part into a variable-length code.

6. The coding apparatus for image compression as defined in claim 5, wherein the lower bit number z is determined in accordance with an order of one of said transform coefficients which corresponds to said first data bit part, wherein said order defines positions of said transform coefficients in the matrix, and wherein the lower bit number z is different for said first data bit parts of at least two of said transform coefficients.

7. A coding apparatus for image compression comprising:
   a transform means for transforming image data into a plurality of transform coefficients arranged in a matrix;
   a quantization means for quantizing said transform coefficients into a respective plurality of coefficient data each having a predetermined number of bits x;
   an absolute-value conversion means for converting each of a predetermined subset of said plurality of coefficient data into a sign bit and (x−1) bits respectively denoting a sign and an absolute value of a corresponding coefficient data;
   a data division means for dividing each of the converted coefficient data into a first data bit part, which is to be fixed-length encoded, consisting of the sign bit and lower w bits (w≧0) and a second data bit part, which is to be variable-length encoded, consisting of the remaining (x−w−1) bits;
   a data conversion means for discarding the lowest bit of said second data bit part and then inverting each bit of the result if the lowest bit of said second data bit part is a logical 1 and, if the lowest bit of said second data bit part is a logical 0, discarding the lowest bit of said second data bit part; and
   a variable-length coding means for encoding the converted second data bit part into a variable-length code.

8. The coding apparatus for image compression as defined in claim 7, wherein the lower bit number w is determined in accordance with an order of one of said transform coefficients which corresponds to said first data bit part, wherein said order defines positions of said transform coefficients in the matrix, and wherein the lower bit number w is different for said first data bit parts of at least two of said transform coefficients.

9. A coding apparatus for image compression comprising:
   a transform means for transforming image data into a plurality of transform coefficients arranged in a matrix;
   a quantization means for quantizing said transform coefficients into a respective plurality of coefficient data each having a predetermined number of bits x;
   a data division means for dividing each of a predetermined subset of said plurality of coefficient data into a first data bit part, which is to be fixed-length encoded, consisting of a sign bit and lower v bits (v≧0) and a second data bit part, which is to be variable-length encoded, consisting of the remaining (x−v−1) bits;

an absolute-value conversion means for converting said second data bit part into its absolute value of (x−v−1) bits based on the sign bit;

a data conversion means for discarding the lowest bit of said variable-length data part and then inverting each bit of the result if the lowest bit of said second data bit part is a logical 1 and, if the lowest bit of said second data bit part is a logical 0, discarding the lowest bit of said second data bit part; and a variable-length coding means for encoding the converted second data bit part into a variable-length code.

10. The coding apparatus for image compression as defined in claim 9, wherein the lower bit number v is determined in accordance with an order of one of said transform coefficients which corresponds to said first data bit part, wherein said order defines positions of said transform coefficients in the matrix, and wherein the lower bit number v is different for said first data bit parts of at least two of said transform coefficients.

* * * * *